United States Patent Office 3,631,149
Patented Dec. 28, 1971

3,631,149
CURABLE COMPOSITIONS OF MATTER COMPRISING EPOXY RESINS WITH 2,6 - XYLENYL-BIGUANIDE
Hans Gempeler, Muttenz, and Paul Zuppinger, Arlesheim, Switzerland, assignors to Ciba Limited, Basel, Switzerland
No Drawing. Filed May 14, 1970, Ser. No. 37,300
Claims priority, application Switzerland, May 19, 1969, 7,678/69
Int. Cl. C08g 30/14
U.S. Cl. 260—47 EN     5 Claims

ABSTRACT OF THE DISCLOSURE

Curable moulding and coating compositions which contain an epoxide resin, for example a polyglycidyl ether, which is solid at room temperature, of a polyphenol such as bisphenol A, as well as 2,6-xylenyl-biguanide as the curing agent. The curable mixtures are suitable for use as single-component systems of good storage stability which rapidly cure in the temperature range of 130–200° C. (sintering powders or prepregs). Compared to other aromatic biguanides, 2,6-xylenylbiguanide has the advantage, as a curing agent, of a greater latency or longer gel time for about equal curing time.

---

It is known that epoxide resins cure with guanidine derivatives, such as especially dicyandiamide, at elevated temperature to give insoluble, crosslinked, high molecular products. The cured products are distinguished by generally good chemical and mechanical properties, but especially by outstanding adhesion to metals and many materials.

For many uses as heat-curing coating and moulding materials, the epoxide resin systems cured with dicyandiamide alone show long gel times and undesirably long curing times at high curing or stoving temperatures; known formulations based on epoxide resin and dicyandiamide must as a rule, for example, be cured for at least 30 to 50 minutes at 180° C., and only then do fully cured products result.

It is furthermore known from Czechoslovakian patent specification No. 120,978 to use aromatic or hydroaromatic biguanide derivatives for the curing of epoxide resins. In comparison to dicyandiamide, the biguanides proposed in the Czech patent specification above all permit a very rapid gelling and curing of the epoxide resins at high temperatures or a gelling and curing at lower temperatures within useful periods of time. For special uses, especially in the field of coating materials, the epoxide resins cured with the biguanides now show relatively short gel times, so that, as a result of these short gel times, processing difficulties occur in the manufacture of mouldings or coatings from the epoxide resin-curing agent system mentioned.

It has now been found that on using 2,6-xylenyl-biguanide as a curing agent for epoxide resins, the above-mentioned disadvantages do not arise or only arise to a greatly reduced extent, since the 2,6-xylenylbiguanide in comparison to the other biguanides results in a latency in the gelling of the epoxide resins which produces an extension of the gel time by about 30% without the complete curing of the epoxide resins being delayed thereby.

The subject of the present application are thus mixtures curable when warm, which are suitable for the manufacture of mouldings, including sheet-like structures, characterised in that they contain a polyepoxide compound with an average of more than one epoxy group in the molecule, and 2,6-xylenylbiguanide as the curing agent.

When manufacturing the curable mixtures a curing amount as for example, 3 to 20 parts by weight, and preferably 5 to 10 parts by weight, of the 2,6-xylenylbiguanide per 100 parts by weight of the polyepoxide compound are advantageously used.

As polyepoxide compounds with an average of more than one epoxide group in the molecule, which are employed in the curable mixtures according to the invention, there may especially be mentioned:

Alicyclic polyepoxides, such as vinylcyclohexene-diepoxide, limonene-diepoxide, dicyclopentadiene-diepoxide, bis - (2,3 - epoxycyclopentyl)-ether, bis-(3,4-epoxycyclohexylmethyl)-adipate, (3',4'-epoxycyclohexylmethyl)-3,4-epoxycyclohexanecarboxylate, (3',4' - epoxy - 6'-methylcyclohexylmethyl) - 3,4 - epoxy - 6 - methylcyclohexanecarboxylate, 3 - (3',4' - epoxycyclohexyl)-2,4-dioxaspiro-(5.5)-8,9-epoxyundecane, 3-(glycidyloxyethoxyethyl)-2,4-dioxaspiro-(5.5)-8,9-epoxy-undecane, 3,9-bis-(3',4'-epoxycyclohexyl)-spirobi-(meta-dioxane).

Diglycidyl or polyglycidyl ethers of polyhydric aliphatic alcohols, such as 1,4-butanediol or polyalkyleneglycols, such as polypropyleneglycols; diglycidyl or polyglycidyl ethers of cycloaliphatic polyols, such as 2,2 - bis - (4-hydroxycyclohexyl)-propane; diglycidyl or polyglycidyl ethers of polyhydric phenols, such as resorcinol, bis-(p-hydroxyphenyl)-methane, 2,2-bis-(p-hydroxyphenyl)-propane (=bisphenol A), 2,2-bis-(4'-hydroxy-3',5'-dibromophenyl) - propane, 1,1,2,2 - tetrakis-(p-hydroxyphenyl)-ethane or condensation products of phenols with formaldehyde obtained under acid conditions, such as phenol novolacs and cresol novolacs.

Polyglycidyl esters of polybasic carboxylic acids, such as phthalic acid, terephthalic acid, $\Delta^4$-tetrahydrophthalic acid and hexahydrophthalic acid.

N-glycidyl derivatives of amines, amides and heterocyclic nitrogen bases, such as N,N-diglycidyl-aniline, N,N-diglycidyl - toluidine, N,N,N',N' - tetraglycidyl - bis-(p-aminophenyl)-methane; triglycidyl isocyanurate; N,N'-diglycidyl-5,5-dimethyl-hydantoin.

If desired, active diluents can be added to the polyepoxides to lower the viscosity, such as for example styrene oxide, butyl glycidyl ether, isooctyl glycidyl ether, phenyl glycidyl ether, cresyl glycidyl ether, glycidyl esters of synthetic, highly branched, mainly tertiary aliphatic monocarboxylic acids ("CARDURA E"); or cycloaliphatic monoepoxides, such as 3-vinyl-2,4-dioxaspiro-(5.5)-9,10-epoxyundecane.

The mixtures of epoxide resin and 2,6-xylenyl-biguanide are preferably cured at 130 to 200° C. for 30 minutes.

Similarly to the case of curing with dicyandiamide, 2,6-xylenyl-biguanide can, where desired, be accelerated with known accelerators of the amine type, such as imidazole, 1-methylimidazole, 2-ethyl-4-methylimidazole, benzimidazole, 4,5-diphenylimidazole, 2-phenylimidazole, 4-aminopyridine, benzyldimethylamine, 2,4,6-tris-(dimethylaminomethyl)-phenol, monurone, guanidine and its acyl derivatives of the type of acetylguanidine, butyrylguanidine and the like.

There is further also the possibility of combining 2,6-xylenylbiguanide with dicyandiamide and in particular, where appropriate, together with the above types of accelerator.

By varying the mixing ratios, curing systems result which can thus be specifically adapted to the requisite curing cycles.

The term "curing" as used here denotes the conversion of the soluble, either liquid or fusible, polyepoxides into solid, insoluble and infusible, three-dimensionally cross-linked products or materials, and in particular, as a rule, with simultaneous shaping to give mouldings, such as castings, pressings, laminates and the like or "sheet-like structures," such as coatings, lacquer films or adhesive bonds.

The curing can, if desired, also be effected in two steps, by first prematurely stopping the curing reaction, or effecting the first stage at room temperature or only slightly elevated temperature, whereby a curable precondensate which is still fusible and soluble (so-called "B-stage") is obtained from the epoxide component and the 2,6-xylenyl-biguanide. Such a precondensate as a rule has good storage stability and can for example serve for the manufacture of "prepregs," compression moulding compositions or sintering powders.

The curable mixtures of polyepoxide compounds and 2,6-xylenylbiguanide as the curing agent can furthermore be mixed, in any stage before curing, with customary modifiers such as extenders, fillers and reinforcing agents, pigments, dye-stuffs, organic solvents, plasticisers, flow control agents, agents for conferring thixotropy, flame-proofing substances or mould release agents.

As extenders, reinforcing agents, fillers and pigments which can be employed in the curable mixtures, there may for example be mentioned:

Coal tar, bitumen, textile fibres, glass fibres, asbestos fibres, boron fibres, carbon fibres, cellulose and polyethylene powder; quartz powder; mineral silicates, such as mica, asbestos powder and slate powder; kaolin, aluminium oxide trihydrate, chalk powder, gypsum, antimony trioxide, bentones, silica aerogel ("AEROSIL"), lithophone, baryte, titanium dioxide, carbon black, graphite, oxide pigments, such as iron oxide or metal powders, such as aluminium powder or iron powder.

Suitable organic solvents for modifying the curable mixtures are, for example, toluene, xylene, n-propanol, butyl acetate, acetone, methyl ethyl ketone, diacetone-alcohol, ethylene glycol monomethyl ether, monoethyl ether and monobutyl ether.

As plasticisers for modifying the curable mixtures it is for example possible to employ dibutyl, dioctyl and dinonyl phthalate, tricresyl phosphate, trixylenyl phosphate and also polypropylene glycols.

As flow control agents when employing the curable mixtures, especially in surface protection, it is for example possible to add silicones, cellulose acetobutyrate, polyvinyl butyral, waxes, stearates and the like (which are in part also used as mould release agents).

Especially for use in the lacquer field, the polyepoxide compounds can furthermore be partially esterified in a known manner with carboxylic acids, such as especially higher unsaturated fatty acids. It is furthermore possible to add other curable synthetic resins, for example phenoplasts or aminoplasts, to such lacquer resin formulations.

The manufacture of the curable mixtures can be effected in the customary manner with the aid of known mixing apparatuses (stirrers, kneaders, rolls and the like).

The curable epoxide resin mixtures are above all employed in the fields of surface protection, the electrical industry, laminating processes and the building industry. They can be employed, in a formulation suited in each case to the special end use, in the unfilled or filled state, optionally in the form of solutions or emulsions, as paints, lacquers, compression moulding compositions, fluidised bed powders, dipping resins, casting resins, injection moulding formulations, impregnating resins and adhesives, and as tool resins, laminating resins, sealing and filling compositions, floor covering compositions and binders for mineral aggregates.

In the examples which follow, parts denote parts by weight and percentages denote percentages by weight, unless otherwise stated. The relationship of parts by volume to parts by weight is as of the millilitre to the gram.

The following epoxide resins were used for the manufacture of curable epoxide resin mixtures described in the examples.

EPOXIDE RESIN A

Solid bisphenol-A-polyglycidyl ether manufactured by condensation of epichlorhydrin with bisphenol A (2,2-bis-(p-hydroxyphenyl)-propane) in the presence of alkali, and having the following characteristics:

epoxide content—1.8–2.4 epoxide equivalents/kg.
melting point (Durran)—65–75° C.
specific gravity—1.19

EPOXIDE RESIN B

Solid bisphenol-A-polglycidyl ether, manufactured by condensation of epichlorhydrin with Bisphenol A in the presence of alkali, having the following characteristics:

epoxide content—0.975–1.210 epoxide equivalents/kg.
melting point (Durran)—95–105° C.
specific gravity—1.19

EPOXIDE RESIN C o-Cresol-novolac-polyglycidyl ether manufactured by condensation of epichlorhydrin with an o-cresol-novolac (molar ratio of o-cresol:formaldehyde≈1:1.1; catalyst: oxalic acid) in the presence of alkali, having the following characteristics:

epoxide content—4.4 epoxide equivalents/kg.
melting point (Durran)—approx. 73° C.

EPOXIDE RESIN D

Solid bisphenol-A-polyglycidyl ether manufactured by condensation of epichlorhydrin with bisphenol A (2,2-bis-(p-hydroxyphenyl)-propane) in the presence of alkali, having the following characteristics:

epoxide content—1.4–1.5 epoxide equivalents/kg.
softening point (Kofler)—60° C.
melting point (Kofler)—75° C.

Manufacture of 2,6-xylenyl-biguanide 2050 g. of water and 510 g. of concentrated hydrochloric acid are introduced into a 4½ litre sulphonation flask. 605 g. of 2,6-xylidine are added dropwise thereto from a dropping funnel over the course of 10 minutes. Thereafter 430 g. of dicyandiamide are added to the clear solution. After 3 hours heating under reflux, the mixture is cooled to 80° C. and 475 g. of aqueous sodium hydroxide solution (43.8% strength) are added over the course of 10 minutes. In the course thereof, the solution becomes cloudy and after stopping the stirrer two layers form, of which the aqueous layer is siphoned off. At about 35° C. the oil spontaneously crystallises to give a crystal sludge. This is filtered off, twice washed with ice water and dried at 40° C. in a vacuum cabinet. Melting point: 138 to 141° C.

*Analysis.*—Calculated (percent): C, 58.51; H, 7.37. Found (percent): C, 58.55; H, 7.26.

Measurement of the gel time

In the examples which follow, the gel time was determined in accordance with an internal test method. The following procedure was adopted:

An electrical heating plate (diameter 115 mm., from Messrs. Electro-Physik, Cologne) was set to the test temperature. The temperature was measured by means of a laterally introduced probe of a thermocouple (Seconds Thermometer, Messrs. Quarz A.G., Zurich). The temperature was constant to ±2° C.

In the case of solid starting material, about 0.5 g. of test material was placed on the plate with a timer (stopwatch) being started simultaneously, and the fused material was then uniformly moved to and fro with a spatula. As the curing proceeds, the viscosity begins to increase. The spatula is now periodically lifted and thread formation is observed. The point in time at which the thread formation suddenly collapses and the material gels to give a coherent layer is the end point of the measurement and the time is recorded on the stopwatch. The time thus measured is given as the gel time in seconds.

If the starting material consists of an epoxide resin-curing agent solution, the gel time of this solution was determined as follows:

2 cm.³ of the resin solution are allowed to run rapidly from a pipette onto the plate, and the solvent is removed as rapidly as possible by good stirring with a wire of 2 cm. length and a diameter of 1 mm. (paperclip). The diameter of the resin area applied to the heating plate should be about 4 cm. The time from completion of the application of the resin solution to the gelling of the resin is given in seconds.

EXAMPLE 1

Several epoxide resin-curing agent solutions were manufactured as follows:

100 parts at a time of epoxide resin A are dissolved in various vessels in a solvent mixture consisting of 60 parts of methyl ethyl ketone and 20 parts of ethylene glycol monomethyl ether. The previously empirically established optimum amounts of curing agent which are indicated in Tables I to IV below are added thereto whilst stirring. As emerges from Tables I to IV, the resin-curing agent system using 2,6-xylenylbiguanide as the curing agent (sample 8) shows the longest gel time in comparison to the other biguanides.

TABLE I

| | Samples | | | | | | | | |
|---|---|---|---|---|---|---|---|---|---|
| | 1 | 2 | 3 | 4 | 5 | 6 | 7 | 8 | 9 |
| Epoxide resin A (parts) | 100 | 100 | 100 | 100 | 100 | 100 | 100 | 100 | 100 |
| Ethylene glycol monomethyl ether (parts) | 20 | 20 | 20 | 20 | 20 | 20 | 20 | 20 | 20 |
| Methyl ethyl ketone (parts) | 60 | 60 | 60 | 60 | 60 | 60 | 60 | 60 | 60 |
| p-Tolylbiguanide (parts) | 7.0 | | | | | | | | |
| p-Ethoxyphenylbiguanide (parts) | | 8.1 | | | | | | | |
| 2,4,5-trimethylphenylbiguanide (parts) | | | 8.0 | | | | | | |
| 2,3-xylenylbiguanide (parts) | | | | 7.5 | | | | | |
| 2,4-xylenylbiguanide (parts) | | | | | 7.5 | | | | |
| 3,4-xylenylbiguanide (parts) | | | | | | 7.5 | | | |
| 2,5-xylenylbiguanide (parts) | | | | | | | 7.5 | | |
| 2,6-xylenylbiguanide (parts) | | | | | | | | 7.5 | |
| Dicyandiamide | | | | | | | | | 4 |
| Gel time at 170° C.±2° (in seconds) | 122 to 124.8 | 118 to 119.7 | 131.5 to 134.5 | 133.1 to 135.8 | 141.7 to 145.8 | 130.2 to 133.0 | 144.1 to 145.9 | 203.4 to 204.9 | 783 to 806.9 |

The resin can be regarded as gelled when, on lifting the wire, the threads formed from the resin tear in a rubbery Gel time of various resin-curing agent systems at 170° C.

TABLE II

| | Samples | | | | | | | | |
|---|---|---|---|---|---|---|---|---|---|
| | 1 | 2 | 3 | 4 | 5 | 6 | 7 | 8 | 9 |
| Epoxide resin A (parts) | 100 | 100 | 100 | 100 | 100 | 100 | 100 | 100 | 100 |
| Ethylene glycol monomethyl ether (parts) | 20 | 20 | 20 | 20 | 20 | 20 | 20 | 20 | 20 |
| Methyl ethyl ketone (parts) | 60 | 60 | 60 | 60 | 60 | 60 | 60 | 60 | 60 |
| p-Tolylbiguanide (parts) | 7.0 | | | | | | | | |
| p-Ethoxyphenylbiguanide (parts) | | 8.1 | | | | | | | |
| 2,4,5-trimethylphenylbiguanide (parts) | | | 8.0 | | | | | | |
| 2,3-xylenylbiguanide (parts) | | | | 7.5 | | | | | |
| 2,4-xylenylbiguanide (parts) | | | | | 7.5 | | | | |
| 3,4-xylenylbiguanide (parts) | | | | | | 7.5 | | | |
| 2,5-xylenylbiguanide (parts) | | | | | | | 7.5 | | |
| 2,6-xylenylbiguanide (parts) | | | | | | | | 7.5 | |
| Dicyandiamide | | | | | | | | | 4 |
| Gel time at 150° C.±2° C. (in seconds) | 247.1 to 252.0 | 231.6 to 238.6 | 272.2 to 275.4 | 282.6 to 291.5 | 283.6 to 290.7 | 268.0 to 273.2 | 302.0 to 307.2 | 434.5 to 440.8 | ~4,000 | manner at a height of about 1 cm. In order to achieve a uniform temperature of the applied resin solution it is Gel time of various resin-curing agent systems at 150° C.

TABLE III

| | Samples | | | | | | | | |
|---|---|---|---|---|---|---|---|---|---|
| | 1 | 2 | 3 | 4 | 5 | 6 | 7 | 8 | 9 |
| Epoxide resin A (parts) | 100 | 100 | 100 | 100 | 100 | 100 | 100 | 100 | 100 |
| Ethylene glycol monomethyl ether (parts) | 20 | 20 | 20 | 20 | 20 | 20 | 20 | 20 | 20 |
| Methyl ethyl ketone (parts) | 60 | 60 | 60 | 60 | 60 | 60 | 60 | 60 | 60 |
| p-Tolylbiguanide (parts) | 7.0 | | | | | | | | |
| p-Ethoxyphenylbiguanide (parts) | | 8.1 | | | | | | | |
| 2,4,5-trimethylphenylbiguanide (parts) | | | 8.0 | | | | | | |
| 2,3-xylenylbiguanide (parts) | | | | 7.5 | | | | | |
| 2,4-xylenylbiguanide (parts) | | | | | 7.5 | | | | |
| 3,4-xylenylbiguandie (parts) | | | | | | 7.5 | | | |
| 2,5-xylenylbiguanide (parts) | | | | | | | 7.5 | | |
| 2,6-xylenylbiguanide (parts) | | | | | | | | 7.5 | |
| Dicyandiamide | | | | | | | | | 4 |
| Gel time at 140° C.±2° C. (in seconds) | 361.6 to 367.0 | 344.9 to 353.1 | 389.3 to 394.1 | 394.0 to 404.8 | 425.0 to 429.0 | 376.6 to 381.0 | 433.7 to 445.1 | 613.4 to 625.9 | ~10,000 | advisable to stir this solution slowly during the entire test procedure.

Gel time of various resin-curing agent systems at 140° C.

TABLE IV

| | Samples | | | | | | | | |
|---|---|---|---|---|---|---|---|---|---|
| | 1 | 2 | 3 | 4 | 5 | 6 | 7 | 8 | 9 |
| Epoxide resin A (parts) | 100 | 100 | 100 | 100 | 100 | 100 | 100 | 100 | 100 |
| Ethylene glycol monomethyl ether (parts) | 20 | 20 | 20 | 20 | 20 | 20 | 20 | 20 | 20 |
| Methyl ethyl ketone (parts) | 60 | 60 | 60 | 60 | 60 | 60 | 60 | 60 | 60 |
| p-Tolylbiguanide (parts) | 7.0 | | | | | | | | |
| p-Ethoxyphenylbiguanide (parts) | | 8.1 | | | | | | | |
| 2,4,5-trimethylphenyl-biguanide (parts) | | | 8.0 | | | | | | |
| 2,3-xylenylbiguanide (parts) | | | | 7.5 | | | | | |
| 2,4-xylenylbiguanide (parts) | | | | | 7.5 | | | | |
| 3,4-xylenylbiguanide (parts) | | | | | | 7.5 | | | |
| 2,5-xylenylbiguanide (parts) | | | | | | | 7.5 | | |
| 2,6-xylenylbiguanide (parts) | | | | | | | | 7.5 | |
| Dicyandiamide | | | | | | | | | 4 |
| Gel time at 130° C.±2° C. (in seconds) | 502.3 to 509.1 | 482.4 to 491.0 | 596.4 to 609.6 | 546.5 to 554.4 | 585.9 to 603.4 | 562.7 to 578.7 | 616.0 to 634.0 | 909.8 to 923.6 | ~25,000 |

Gel time of various resin-curing agent systems at 130° C.

EXAMPLE 2

(a) An epoxide resin sintering powder mixture of the following composition was manufactured:

| | Parts |
|---|---|
| Epoxide resin B | 706.4 |
| Epoxide resin C | 407.4 |
| Titanium dioxide (rutile) | 755.4 |
| Silica aerogel (Aerosil, registered trade name of Messrs. Degussa) | 11.6 |
| Polyvinylbutyral [1] (registered trade name Butvar D-510) | 28.4 |
| Polyethylene powder | 5.6 |
| 2,6 - xylenylbiguanide | 57.7 |

[1] Levelling agent.

The mixture of the epoxide resins is fused in a steel vessel whilst warming to about 170° C. The following are added to the melt in the sequence given below:

Polyvinyl butyral, polyethylene powder, silica aerogel and titanium dioxide.

The mixture is then stirred for a further 10 minutes without additional supply of heat, in the course of which the temperature drops to about 120° C. Thereafter the mass is cast in thin layers onto cellophane paper and allowed to solidify. After cooling, the resin is comminuted by means of a beater mill (particle size <3 mm.) and mixed with the 2,6-xylenylbiguanide. Mixing is carried out in a ball mill without balls. Thereafter the powder mixture is homogenised for 4 minutes at 80 to 90° C. in a mixing apparatus which can be heated. After cooling, the resin/curing agent melt is first coarsely ground (beater mill) and then finely ground (pin mill). After sieving to a particle size of <100µ, an epoxide resin powder is obtained which was excellently suited to electrostatic spraying application and which shows the following properties:

(1) Properties of the powder melting point (Kofler)—90° C.
gel time, 150° C.—315 seconds
gel time, 180° C.—175 seconds
levelling (visual assessment)—good (2) Properties of the cured coating (application by means of electrostatic spraying installation of Messrs. Sames onto degreased cold steel sheets)

| Stoving conditions | 40 min. (130° C.) | 20 min. (150° C.) | 10 min. (180° C.) |
|---|---|---|---|
| Deep drawing value according to Erichsen (DIN 53,156) mm | 9.1 | 8.6 | 9.8 |
| Gloss (photovolt meter; ≮60°) | 100 | 100 | 98 |

(b) For comparison, an epoxide resin sintering powder was manufactured which, whilst otherwise being of exactly the same composition, contained 53.8 parts of p-tolylbiguanide as the curing agent instead of 57.7 parts of 2,6-xyleneylbiguanide. The following properties were determined:

(1) Properties of the powder melting point (Kofler)—100° C.
gel time, 150° C.—102 seconds
gel time, 180° C.—75 seconds
levelling (visual assessment)—good (2) Properties of the cured coating (application by means of electrostatic spraying installation of Messrs. Sames onto degreased cold steel sheets)

| Stoving conditions | 30 min. (150° C.) | 10 min. (180° C.) |
|---|---|---|
| Deep drawing value according to Erichsen (DIN 53,156) mm | 7.2 | 8.3 |
| Gloss (photovolt meter; ≮60°) | 100 | 100 |

(c) For further comparison, an epoxide resin sintering powder was manufactured which, whilst otherwise having exactly the same composition, contained 67 parts of dicyandiamide as the curing agent instead of 57.7 parts of 2,6-xylenylbiguanide. The following properties were determined:

(1) Properties of the powder melting point (Kofler)—85° C.
gel time, 150° C.—374 seconds
gel time, 180° C.—240 seconds
leveling (visual assessment)—good (2) Properties of the cured coating (application by means of electrostatic spraying installation of Messrs. Sames onto degreased cold steel sheets)

| Stoving conditions | 30 min. (150° C.) | 45 min. (180° C.) |
|---|---|---|
| Deep drawing value according to Erichsen (DIN 53,156) mm | [1] <1 | 9.6 |
| Gloss (photovolt meter, ≮60°) | 95 | 88 |

[1] Cure inadequate.

EXAMPLE 3

(a) A liquid mixture consisting of:

| | Parts |
|---|---|
| Epoxide resin A | 100 |
| Methyl ethyl ketone | 70 |
| 2,6-xylenylbiguanide | 7.5 | having a viscosity (according to DIN 53,211, No. 4) of 21.0 seconds, was used for the manufacture of laminate sheets.

To do so, 12 square cuttings of 12 cm. edge length of woven glass fabric 92,145 of Messrs. Interglas, having a finish based on methacrylato-chromium$^{III}$-chloride complex (registered trade name "Volan A") were in each case produced, impregnated with the liquid mixture and subsequently dried for 11 minutes at 170° C. The 12 impregnated cuttings were stacked on top of one another and the entire packet was wrapped in a cellophane sheet pretreated with release agent and introduced between two metal sheets into a preheated press. The assembly was surface-gelled under contact pressure and was then cured under a pressure of 20 kg./cm.² for 1 hour at 140° C. (laminate I) or for 1 hour at 160° C. (laminate II).

(b) For comparison, laminate sheets were manufactured using a liquid mixture of the following composition:

| | Parts |
|---|---|
| Epoxide resin A | 100 |
| Methyl ethyl ketone | 70 |
| p-Tolybiguanide | 7.0 |

The woven glass fabrics impregnated with this mixture were dried for 8 minutes at 130° C. and subsequently processed into laminates as described in Example 3(a), with the curing being effected under a pressure of 20 kg./cm.² for 1 hour at 130° C. (laminate III) or 1 hour at 150° C. (laminate IV).

(c) For further comparison, laminate sheets were manufactured using a liquid mixture of the following composition:

| | Parts |
|---|---|
| Epoxide resin A | 100 |
| Methyl ethyl ketone | 40 |
| Ethylene glycol monomethyl ether | 46 |
| Dicyandiamide | 4 |

Viscosity of the mixture (according to DIN 53,211, No. 4) 21.0 seconds. The woven glass fabrics impregnated with this mixture were dried for 11 minutes at 170° C. and subsequently processed into laminates as described in Example 3(a), with the curing being effected under a pressure of 20 kg./cm.² for 1 hour at 180° C. (laminate V) at 150° C. (laminate IV).

If, against this, the curing of the present system is effected at the temperatures indicated in Example 3(a) or 3(b), products which are only incompletely cured or, at temperatures of below 160° C., even only surface-gelled are obtained.

The laminates manufactured in Examples 3(a), 3(b) and 3(c) show the following mechanical and dielectric properties.

| | Curing conditions, hour/temp. (° C.) | Flexural strength according to VSM 77103 (kg./mm.²) | Flexural strength after 1 hour's storage in deep water (kg./mm.²) | Impact strength according to VSM 77105 (kg./cm.²) |
|---|---|---|---|---|
| Laminate: | | | | |
| I | 1/140 | 48.09 | 49.31 | 115.94 |
| II | 1/160 | 46.50 | 44.07 | 99.38 |
| III | 1/130 | 47.41 | 40.70 | 90.99 |
| IV | 1/150 | 44.55 | 40.96 | 99.72 |
| V | 1/180 | 49.79 | 49.38 | 106.09 |
| VI | 1/200 | 48.95 | 48.27 | 89.77 |

EXAMPLE 4

(a) An epoxide resin stoving lacquer of the following composition was manufactured:

| | Parts |
|---|---|
| Epoxide resin D, 50% strength solution [1] | 100.0 |
| 2,6-xylenylbiguanide | 3.0 |
| Butylated hexamethylolmelamine [2] | 2.0 |
| Solvent mixture [1] | 53.5 |
| Ethylene glycol monoethyl ether | 3.5 |
| Spraying lacquer, 33% strength | 162.0 |

[1] Solvent consisting of a mixture of 95% alcohol, diacetone-alcohol, toluene and methyl ethyl ketone in the ratio of 1:1:1:1 parts.
[2] Flow control agent.

A 50% strength solution was manufactured from the epoxide resin D and the solvent mixture. 2,6-xylenylbiguanide together with the levelling agent, dissolved in ethylene glycol monoethyl ether, are added to this solution. A 33% strength spraying lacquer was manufactured by further addition of solvent mixture, and was applied to previously cleaned 0.5 mm. thick sheets of pure aluminium by means of a spray gun. The curing conditions are indicated in the table below.

(b) For comparison, an epoxide resin stoving lacquer which, whilst otherwise of the same composition, contained dicyandiamide as the curing agent instead of 2,6-xylenylbiguanide, was manufactured.

| | Parts |
|---|---|
| Epoxide resin D, 50% strength solution [1] | 100.0 |
| Dicyandiamide | 1.5 |
| Butylated hexamethylolmelamine [2] | 2.0 |
| Solvent mixtures | 56.0 |
| Dimethylformamide | 2.5 |
| Spraying lacquer, 33% strength | 162.0 |

[1] Solvent consisting of a mixture of 95% alcohol, diacetone-alcohol, toluene and methyl ethyl ketone in the ratio of 1:1:1:1 parts.
[2] Flow control agent.

This spraying lacquer was also applied to 0.5 mm. thick sheets of pure aluminium and cured under the same conditions.

Properties of the lacquer coatings (film thickness: approximately 30 microns).

| Curing agent | 2,6-xylenylbiguanide | | | | Dicyandiamide | | | |
|---|---|---|---|---|---|---|---|---|
| Curing temperature (° C.) | 150 | 180 | 180 | 180 | 150 | 180 | 180 | 180 |
| Time (minutes) | 30 | 15 | 30 | 60 | 30 | 15 | 30 | 60 |
| Hardness according to Persoz (seconds) | 370 | 380 | 375 | 380 | 378 | 380 | 380 | 390 |
| Flexural test, 1×180° (according to DIN 53,152) (mandrel φ 1 mm.) | G | G | G | G | R | R | G | G |
| Extensibility according to Erichsen (mm.) (according to DIN 53,156) | 9.0 | 9.2 | 9.3 | 9.3 | 0.5 | 0.7 | 8.8 | 9.0 |
| Deep drawing under impact (cm./kg.) | >180 | >180 | >180 | >180 | >5 | >5 | >180 | >180 |

G=good and flexible.
R=crack formation.

| | Curing conditions, hour/temp. (° C.) | Temperatures in ° C. for a particular value of tg δ= (50 Hz) | |
|---|---|---|---|
| | | tg δ=1×10⁻² | tg δ=3×10⁻² |
| Laminate: | | | |
| I | 1/140 | 87 | 101 |
| II | 1/160 | 87 | 101 |
| III | 1/130 | 77 | 90 |
| IV | 1/150 | 72 | 86 |
| V | 1/180 | 84 | 101 |
| VI | 1/200 | 94 | 107 |

We claim:
1. A composition of matter which comprises a polyepoxide with an average of more than one epoxide group in the molecule, and a curing amount of 2,6-xylenylbiguanide as the curing agent.
2. Composition according to claim 1, which contains 3 to 20 parts by weight of 2,6-xylenylbiguanide per 100 parts by weight of the polyepoxide.

3. Composition according to claim 1, which contains 5 to 10 parts by weight of 2,6-xylenylbiguanide per 100 parts by weight of the polyepoxide.

4. Composition according to claim 1, which contains a polyglycidyl ether of a polyhydric phenol as the polyepoxide.

5. Composition according to claim 4, which contains a polyglycidyl ether of 2,2-bis-(p-hydroxy-phenyl)-propane as the polyepoxide.

References Cited

UNITED STATES PATENTS 3,261,809  7/1966  Sherr _____ 260—47 Ep

WILLIAM H. SHORT, Primary Examiner

T. E. PERTILLA, Assistant Examiner

U.S. Cl. X.R.

117—127, 161 ZB, 169 R; 161—184; 260—2 N, 9 R, 13, 31.2 N, 28, 32.8 Ep, 33.4 Ep, 33.6 Ep, 37 Ep, 59, 77 SR, 78.4 Ep, 830 TW